United States Patent
Rigaud et al.

(10) Patent No.: US 12,479,566 B2
(45) Date of Patent: Nov. 25, 2025

(54) METHOD FOR ASSEMBLING AN AIRCRAFT CENTRAL WING BOX INVOLVING A STEP OF FASTENING THE EQUIPMENT TO AT LEAST ONE ASSEMBLY SUPPORT SITUATED OUTSIDE THE CENTRAL WING BOX

(71) Applicant: Airbus Operations SAS, Toulouse (FR)

(72) Inventors: Christophe Rigaud, Toulouse (FR); Carole Beau, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/677,402

(22) Filed: May 29, 2024

(65) Prior Publication Data
US 2024/0400187 A1   Dec. 5, 2024

(30) Foreign Application Priority Data
May 31, 2023   (FR) ........................... 2305383

(51) Int. Cl.
*B64C 3/18* (2006.01)
*B64F 5/10* (2017.01)

(52) U.S. Cl.
CPC .............. *B64C 3/185* (2013.01); *B64F 5/10* (2017.01)

(58) Field of Classification Search
CPC .............. B64C 1/26; B64C 3/18; B64C 3/185
See application file for complete search history.

(56) References Cited

U.S. PATENT DOCUMENTS

| | | | |
|---|---|---|---|
| 6,170,157 B1 * | 1/2001 | Munk | B64F 5/10 29/407.01 |
| 2012/0160968 A1 * | 6/2012 | Barmichev | B64C 25/12 244/45 R |
| 2012/0292435 A1 | 11/2012 | Karem | |
| 2017/0158306 A1 * | 6/2017 | Kooiman | B64C 29/0033 |
| 2020/0108949 A1 | 4/2020 | Watkins et al. | |
| 2022/0266978 A1 | 8/2022 | Brakes et al. | |

FOREIGN PATENT DOCUMENTS

| | | |
|---|---|---|
| EP | 2741957 B1 | 10/2018 |
| EP | 3636554 B1 | 12/2022 |

OTHER PUBLICATIONS

French Search Report for corresponding French Patent Application No. 2305383 dated Dec. 6, 2023.

* cited by examiner

*Primary Examiner* — Timothy D Collins
*Assistant Examiner* — Eric Acosta
(74) *Attorney, Agent, or Firm* — Greer, Burns & Crain, Ltd.

(57) ABSTRACT

A method for assembling a central wing box for an aircraft by assembling the upper and lower panels and the front and rear spars in order to obtain a main structure, fastening equipment to at least one assembly support positioned outside the main structure, inserting at least one mounting support inside the main structure, and securing the assembly support to the main structure. Also a central wing box and an aircraft having such a central wing box.

14 Claims, 4 Drawing Sheets

METHOD FOR ASSEMBLING AN AIRCRAFT CENTRAL WING BOX INVOLVING A STEP OF FASTENING THE EQUIPMENT TO AT LEAST ONE ASSEMBLY SUPPORT SITUATED OUTSIDE THE CENTRAL WING BOX

CROSS-REFERENCES TO RELATED APPLICATIONS

This application claims the benefit of French Patent Application Number 2305383 filed on May 31, 2023, the entire disclosure of which is incorporated herein by way of reference.

FIELD OF THE INVENTION

The present application relates to a method for assembling an aircraft central wing box involving a step of fastening the equipment to at least one assembly support situated outside the central wing box, to a central wing box obtained using said method and to an aircraft having said central wing box.

BACKGROUND OF THE INVENTION

According to an embodiment visible in FIGS. 1A and 1B, an aircraft comprises a fuselage 10 that extends between a nose 10.1 and a tail 10.2, wings 12 and a central wing box 14 connecting the wings 12 and the fuselage 10.

For the present application, a longitudinal direction is a direction parallel to a longitudinal axis, which is horizontal when the aircraft is on the ground, and extends between the nose and tail 10.1, 10.2. A transverse direction is a direction that is horizontal when the aircraft is on the ground and perpendicular to the longitudinal direction. A longitudinal plane is a plane that is vertical when the aircraft is on the ground and parallel to the longitudinal axis. A transverse plane is a plane perpendicular to the longitudinal axis.

As illustrated in FIGS. 2 to 4, the central wing box 14 comprises upper and lower panels 16, 18 offset in the vertical direction, front and rear spars 20, 22 positioned in transverse planes offset in the longitudinal direction and right and left end ribs 24, 26 positioned in longitudinal planes offset in the transverse direction.

The central wing box 14 also comprises reinforcing elements, such as stiffeners 28 situated at least on the internal faces of the upper and lower panels 16, 18, intermediate ribs 30 in the form of a frame, positioned in longitudinal planes, and rods 32 connecting the upper and lower panels 16, 18, inclined and positioned in longitudinal planes.

The central wing box 14 also comprises numerous items of equipment 34 positioned inside the central wing box 14 and connected to at least one element among the upper and lower panels 16, 18 and the front and rear spars 20, 22. By way of example, this equipment 34 may be mechanical, electrical, fluidic or other equipment.

According to one operating mode, an assembly method comprises a step of assembling the upper and lower panels 16, 18 provided with the stiffeners 28, the front and rear spars 20, 22, the intermediate ribs 30, the rods 32 and the right and left end ribs 24, 26 so as to obtain a box-type structure. Next, the assembly process includes operations of placement and fastening of the items of equipment 34, one by one, inside the central wing box 14.

In order to carry out the operations of placement and fastening of the equipment 34, at least one operator enters the closed central wing box via at least one opening provided at least one of the right and left end ribs 24 and 26. The equipment 34 is introduced via this (or these) opening(s), then positioned and fastened by the operator present in the central wing box by slipping between the rods 32, as illustrated in FIG. 4. Consequently, these placement and fastening operations are not easy to carry out.

These operations of placement and fastening of the equipment 34 can only be carried out when the central wing box 14 is connected to the rest of the fuselage 10.

Since the items of equipment 34 are installed one after the other in the central wing box 14, these placement and fastening operations are relatively long and affect the time required for assembling the aircraft.

According to another aspect, it is generally necessary to pierce the front and rear spars 20, 22 in order to fasten the equipment 34. These piercing operations generate chips and dust that pollute the aircraft.

SUMMARY OF THE INVENTION

The present invention aims to remedy all or some of the drawbacks of the prior art.

To this end, one subject of the invention is a method for assembling a central wing box having:
- a main structure that comprises upper and lower panels offset in a vertical direction and front and rear spars positioned in transverse planes perpendicular to a longitudinal direction and offset in this longitudinal direction,
- equipment positioned at least partially inside the central wing box and connected to the main structure,
- the method comprising a step of assembling, at least partially, the main structure.

According to the invention, the method comprises a step of fastening the equipment to at least one assembly support positioned outside the main structure, a step of inserting said at least one assembly support inside the main structure and a step of securing said at least one assembly support to the main structure by virtue of at least one first connection directly or indirectly connecting each assembly support to the upper panel and at least one second connection directly or indirectly connecting each assembly support to the lower panel.

This assembly method makes it possible to reduce the time spent working on the central wing box during the placement of the equipment.

Fastening the equipment to at least one assembly support outside the central wing box provides the operators with better ergonomics. Finally, since the piercings necessary for fastening the equipment are realized outside the central wing box and the aircraft, any debris or chips generated do not pollute the inside of the central wing box and the aircraft.

According to another feature, the equipment is fastened to a plurality of assembly supports that are held at least temporarily immobile relative to one another so as to form a module.

According to another feature, the module is introduced and fastened, as a single unit, in the central wing box.

According to another feature, the assembly supports are temporarily connected to a template during the steps of inserting and securing the assembly supports, the template being removed from the main structure after the step of securing the assembly supports.

Another subject of the invention is a central wing box obtained using the method according to one of the preceding features. The central wing box has on the one hand a main structure that comprises upper and lower panels offset in a vertical direction and front and rear spars positioned in transverse planes perpendicular to a longitudinal direction and offset in this longitudinal direction and, on the other hand, equipment positioned at least partially inside the central wing box and connected to the main structure.

According to the invention, the central wing box comprises at least one assembly support to which the equipment is fastened, at least one first connection directly or indirectly connecting the assembly support and the upper panel of the main structure and at least one second connection directly or indirectly connecting the assembly support and the lower panel of the main structure.

According to another feature, each assembly support comprises at least one plate, to which the equipment is fastened, substantially parallel to the front or rear spar.

According to another feature, each assembly support comprises first and second connecting rods connected to the plate and spaced apart from each other, the first and second connecting rods each having a first end connected directly or indirectly to the upper panel by the first connection and a second end connected directly or indirectly to the lower panel by the second connection.

According to another feature, the first and second connecting rods are positioned in substantially longitudinal planes.

According to another feature, at least one of the first and second connections comprises a pivot connection having a pivot axis oriented in a transverse direction perpendicular to the vertical and longitudinal directions.

According to another feature, the first or second connection comprises:
 a clevis as one with the assembly support and having spaced-apart arms,
 a web as one with the upper or lower panel, or with an element connected to the upper or lower panel, positioned in a longitudinal plane between the arms,
 orifices passing through the arms and the web, said orifices being aligned,
 a pivot pin, connecting the clevis and the web, housed in the orifices passing through the arms and the web, said pivot pin being oriented in the transverse direction.

According to another feature, the central wing box comprises a plurality of assembly supports each having at least one plate, the plates of the various assembly supports being positioned in one and the same transverse plane.

Another subject of the invention is a module intended to be integrated in a central wing box, having a plurality of assembly supports that are at least temporarily immobile relative to one another and equipment fastened to the assembly supports.

Another subject of the invention is an aircraft having a central wing box according to one of the preceding features.

BRIEF DESCRIPTION OF THE DRAWINGS

Further features and advantages will become apparent from the following description of the invention, which description is given solely by way of example, with reference to the appended drawings in which.

DETAILED DESCRIPTION OF THE PREFERRED EMBODIMENTS

Figure 7:
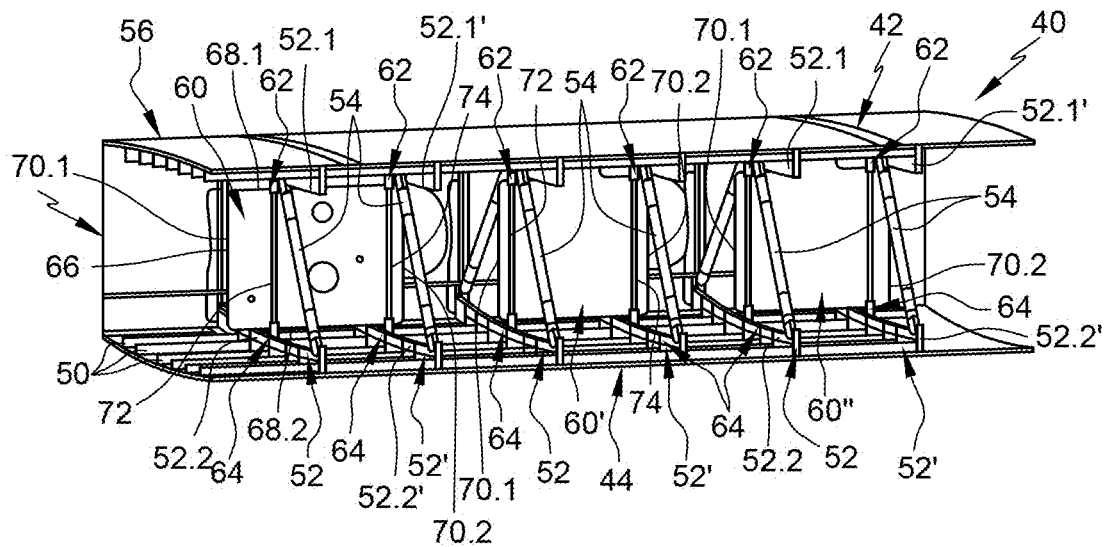
FIG. 7 is a perspective view of a part of a central wing box, the equipment not being shown, illustrating an embodiment of the invention.
Figure 8:
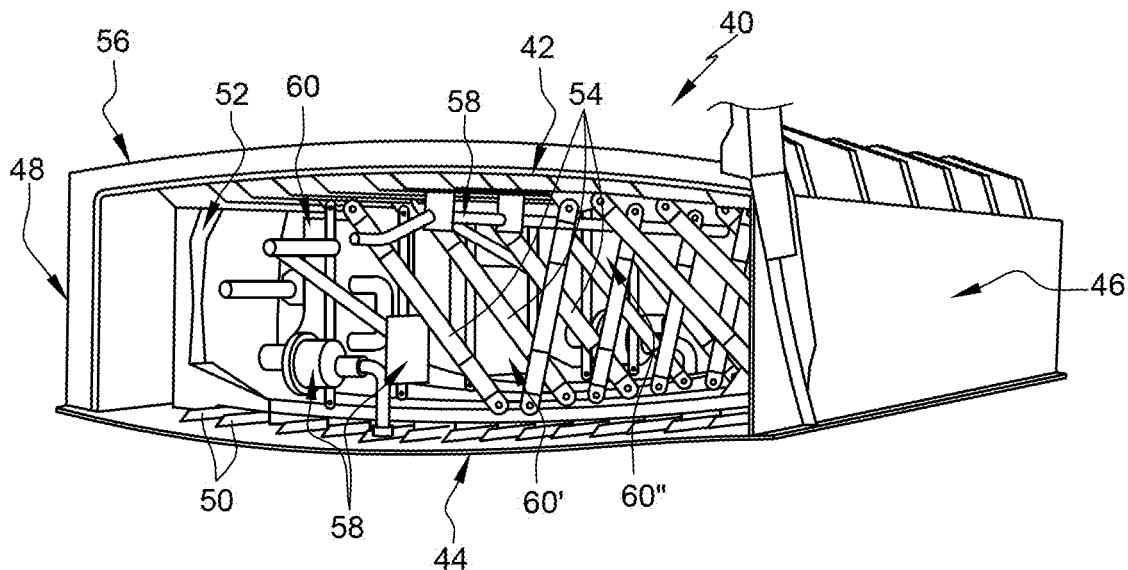
FIG. 8 is a perspective view of a central wing box, illustrating an embodiment of the invention.

According to an embodiment visible in FIGS. 7 and 8, a central wing box 40 comprises upper and lower panels 42, 44 offset in the vertical direction, front and rear spars 46, 48 positioned in transverse planes offset in the longitudinal direction and right and left end ribs (not shown) positioned in longitudinal planes offset in the transverse direction.

The central wing box 40 also comprises reinforcing elements, such as stiffeners 50 situated at least on the internal faces of the upper and lower panels 42, 44, intermediate ribs 52 in the form of a frame, positioned in longitudinal planes, and rods 54 connecting the upper and lower panels 42, 44, inclined and positioned in longitudinal planes.

According to one configuration, the central wing box 40 comprises a plurality of pairs of intermediate ribs 52 each connected to at least one element among the upper and lower panels 42, 44 and the front and rear spars 46, 48. According to one embodiment, each intermediate rib 52 comprises a web 52A (visible in FIGS. 5 and 9) and a first part 52.1 secured to the upper panel 42 and a second part 52.2 secured to the lower panel (which are visible in FIGS. 5 and 7).

Of course, the invention is not limited to the embodiment visible in FIGS. 7 and 8 for the central wing box 40. By way of example, the latter may comprise at least one transverse partition. Whatever the embodiment, the central wing box 40 comprises a main structure 56 constituted of the upper and lower panels 42, 44 and the front and rear spars 46, 48 forming a tubular structure that has right and left lateral openings.

The central wing box 40 comprises a plurality of items of equipment 58 positioned at least partially inside the central wing box 40 and connected to the main structure 56. By way of example, this equipment 58 may be mechanical, electrical, fluidic or other equipment.

According to one feature, the central wing box 40 comprises at least one assembly support 60 to which the equipment 58 is fastened, and at least one connection 62, 64 connecting the assembly support 60 and the main structure 56.

According to one operating mode, a method for assembling a central wing box 40 comprises a first step of assembling, at least partially, the main structure 56, a step of fastening the equipment 58 to at least one assembly support 60 positioned outside the main structure 56, a step of inserting said at least one mounting support 60 inside the main structure 56, after the step of fastening the equipment 58, and a step of securing said at least one assembly support 60 to the main structure 56 by virtue of at least one first connection 62 directly or indirectly connecting each assembly support 60 to the upper panel 42 and at least one second connection 64 directly or indirectly connecting each assembly support 60 to the lower panel 44.

According to one configuration, the equipment 58 is fastened to the (one or more) assembly support(s) 60 in concurrent operation time, during the execution of other steps of assembling the central wing box 40 or the aircraft, then the subassembly formed by the equipment 58 and the (one or more) assembly support(s) 60 is mounted in a single operation in the main structure 56 by introducing it via one of the right or left lateral ends of the main structure 56, and this makes it possible to reduce the time spent working on the central wing box 40 and to limit the impact of the installation of the equipment 58 on the time required for assembling the aircraft.

Fastening the equipment 58 to the (one or more) assembly support(s) 60 outside the central wing box 40 provides the operators with better ergonomics, since they can circulate easily all around the (one or more) assembly support(s) 60.

Finally, during the piercings necessary for the fastening of the equipment 58, any debris or chips are generated outside the aircraft and do not pollute the inside of the aircraft.

According to one embodiment, each assembly support 60 comprises at least one plate 66 to which the equipment 58 is fastened. Each plate 66 has an upper edge 68.1 close to the upper panel 42, substantially parallel (i.e., +/−10 degrees) to the latter, a lower edge 68.2 close to the lower panel 44, substantially parallel to the latter, and first and second substantially vertical lateral edges 70.1, 70.2 connecting the upper and lower edges 68.1, 68.2.

According to one configuration, the central wing box 40 comprises at least one first connection 62 directly or indirectly connecting each assembly support 60 to the upper panel 42 and at least one second connection 64 directly or indirectly connecting each assembly support 60 to the lower panel 44. Thus, each assembly support 60 can perform the function of reinforcing the main structure 56, instead of or in addition to the rods 54.

According to one arrangement, the plate 66 of each assembly support 60 is positioned in a transverse plane substantially parallel to the front or rear spar 46, 48. According to one configuration, the plate 66 of each assembly support 60 is closer to the rear spar 48 than to the front spar 46.

Figure 1A:
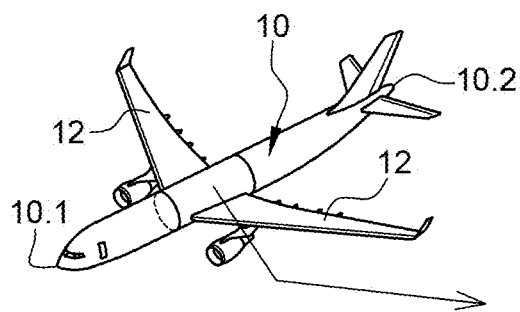
FIG. 1A is a perspective view of an aircraft.
Figure 1B:
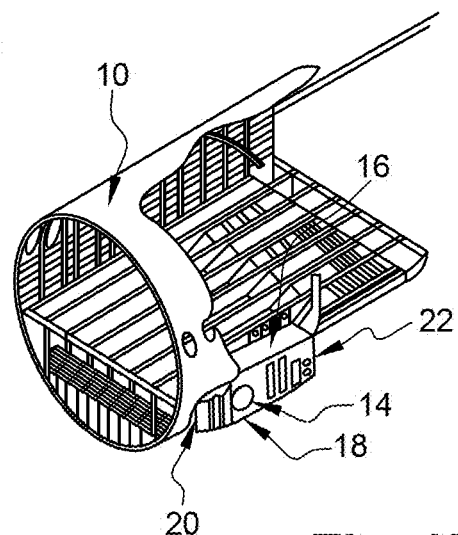
FIG. 1B is a detail of a central part of the aircraft of FIG. 1A.
Figure 2:
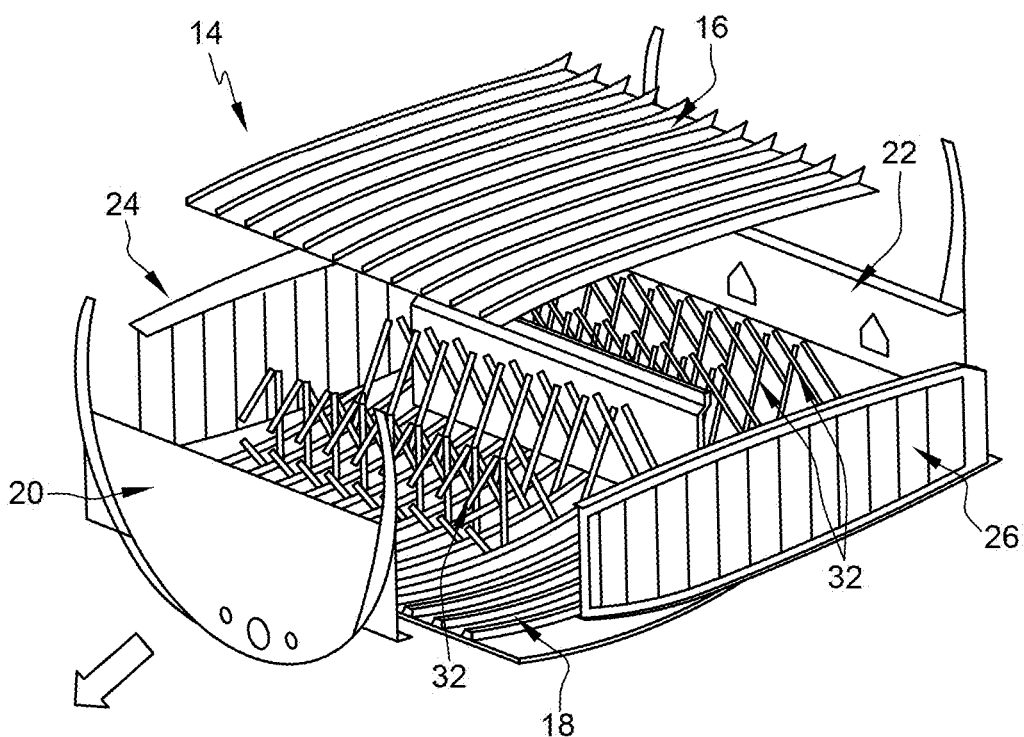
FIG. 2 is an exploded perspective view of a central wing box.
Figure 3:
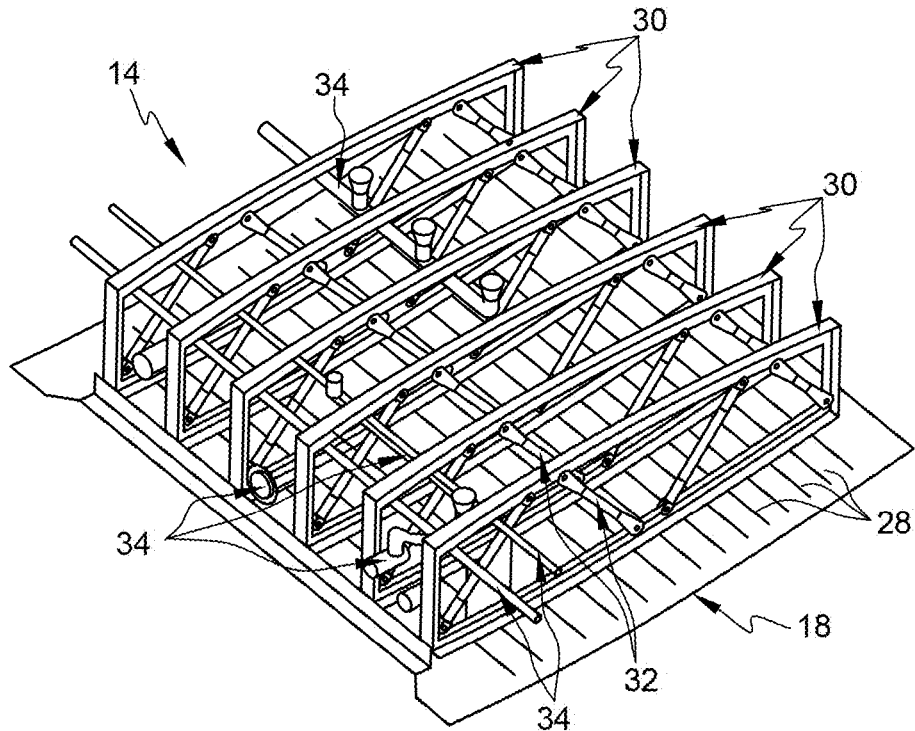
FIG. 3 is a perspective view of a central wing box, without its upper panel and its front and rear spars, illustrating an embodiment of the prior art.
Figure 4:
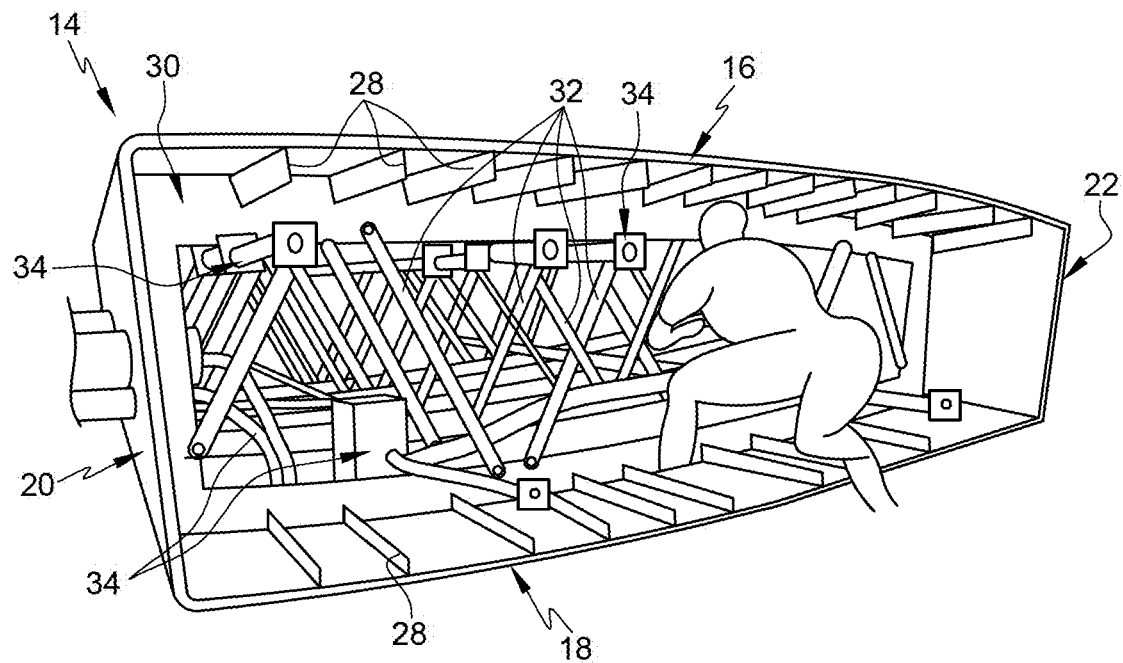
FIG. 4 is a perspective view of a central wing box, during the placement of the equipment, illustrating an embodiment of the prior art.
Figure 5:
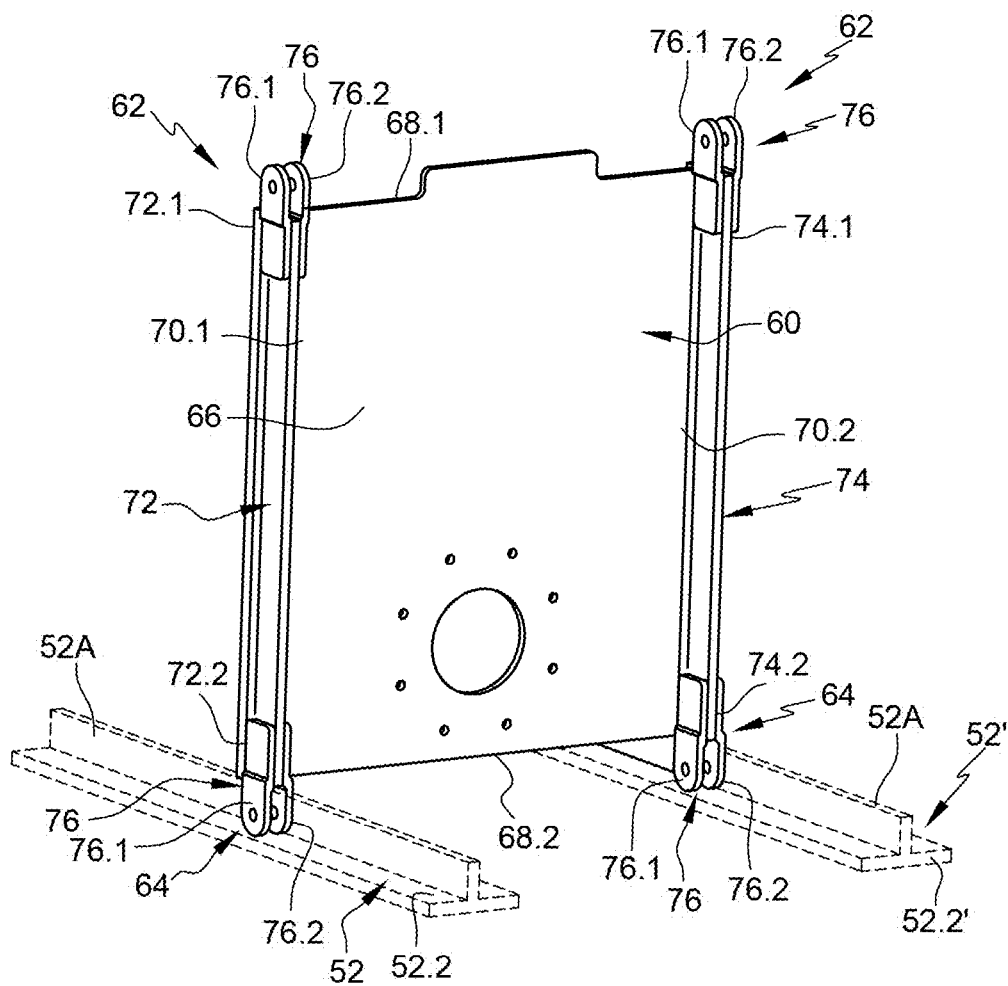
FIG. 5 is a perspective view of an assembly support, illustrating an embodiment of the invention.
Figure 6:
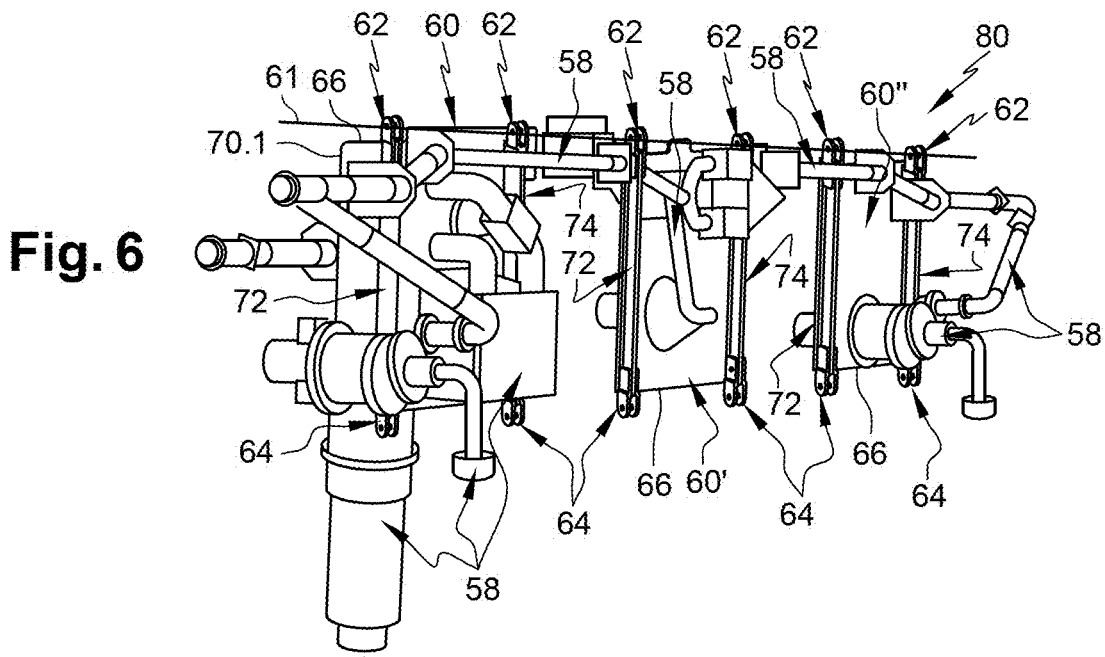
FIG. 6 is a perspective view of a sub-assembly comprising equipment and assembly supports, illustrating an embodiment of the invention.

According to an embodiment visible in FIG. 5, each assembly support 60 comprises first and second connecting rods 72, 74 connected to the plate 66 and spaced apart from each other, the first connecting rod 72 being positioned at or close to the first lateral edge 70.1 of the plate 66, the second connecting rod 74 being positioned at or close to the second lateral edge 70.2 of the plate 66, the first and second connecting rods 72, 74 each having a first end 72.1, 74.1, projecting relative to the upper edge 68.1 of the plate 66, directly or indirectly connected to the upper panel 42 by a first connection 62 and a second end 72.2, 74.2, projecting relative to the lower edge 68.2 of the plate 66, directly or indirectly connected to the lower panel 44 by a second connection 64.

According to the embodiment visible in FIG. 5, the first and second connecting rods 72, 74 are positioned in substantially longitudinal planes. They are substantially vertical. According to one configuration, each first or second connecting rod 72, 74 is positioned in the plane of an intermediate rib 52.

According to one embodiment, the plates 66 are metallic, made of composite material or hybrid (metallic and made of composite material). The first and second connecting rods 72, 74 are generally metallic. They have a T-shaped section in a horizontal plane. For each assembly support 60, the plate 66 is connected to each of the first and second connecting rods 72, 74 by welding or by virtue of connecting elements such as rivets or bolts, for example. Of course, the invention is not limited to these materials for the plate 66 and the connecting rods 72, 74, to this section for the connecting rods 72, 74 or to this type of connection for connecting the plate 66 and the connecting rods 72, 74.

According to one configuration, the central wing box 40 comprises a plurality of assembly supports 60, 60', 60" each having at least one plate 66, the plates 66 of the various assembly supports 60, 60', 60" being positioned in one and the same transverse plane.

In the presence of a plurality of assembly supports 60, 60', 60", one and the same item of equipment 58 can be connected to a plurality of assembly supports 60, 60', 60". The various assembly supports 60, 60', 60" are immobilized relative to one another during the fastening of the equipment 58 and during the placement and the securing of the assembly supports 60, 60', 60" in the central wing box 40. To this end, the various assembly supports 60, 60', 60" are immobilized relative to one another by being temporarily connected to one and the same template 61 at least during the step of fastening the equipment 58 to the assembly supports 60, 60', 60". According to one operating mode, the assembly supports 60, 60', 60" are temporarily connected to the template during the steps of inserting and securing the assembly supports 60, 60', 60", the template being removed from the main structure 56 after the step of securing the assembly supports 60, 60', 60".

According to another operating mode, the assembly supports 60, 60', 60" are held immobile relative to one another by virtue of a tool used to position them at the same time and according to the same kinematics in the central wing box 40.

Whatever the embodiment, the assembly supports 60, 60', 60" on which the equipment 58 is assembled outside the main structure 56 are held at least temporarily immobile relative to one another so as to form a module 80, at least during the step of fastening the equipment 58 to the assembly supports 60, 60, 60". According to one operating mode, this module 80 is introduced and fastened, as a single unit, in the central wing box 40.

Providing a plurality of assembly supports 60, 60', 60" having plates 66 positioned in the same transverse plane allows the central wing box 40 to potentially be able to bend in a transverse plane, about an axis parallel to the longitudinal direction.

For each assembly support 60, 60', 60", the first and second ends 72.1, 72.2 of the first connecting rod 72 are connected to a first intermediate rib 52, the first end 72.1 being connected to the first part 52.1 of the first intermediate rib 52 as one with the upper panel 42, the second end 72.2 being connected to the second part 52.2 of the first intermediate rib 52 as one with the lower panel 44. The first and second ends 74.1, 74.2 of the second connecting rod 74 are connected to a second intermediate rib 52', the first end 74.1 being connected to the first part 52.1' of the second intermediate rib 52' as one with the upper panel 42, the second end 74.2 being connected to the second part 52.2' of the second intermediate rib 52' as one with the lower panel 44.

According to one embodiment, at least one of the first and second connections 62, 64 comprises a pivot connection having a pivot axis oriented transversely. In one configuration, the pivot connection is ball-jointed.

Figure 9:
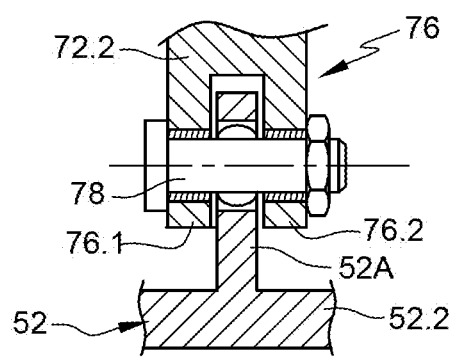
FIG. 9 is a transverse cross section of a connection connecting an assembly support and an intermediate frame, illustrating an embodiment of the invention.

According to an arrangement visible in FIG. 9, at least one of the first and second connections 62, 64 comprises a clevis 76 as one with the assembly support 60, more particularly with the first or second end 72.1, 72.2, 74.1, 74.2 of the first or second connecting rod 72, 74, said clevis 76 having spaced-apart arms 76.1, 76.2, a web 52A as one with the upper or lower panel 42, 44 or with an element, such as an intermediate rib 52, connected to the upper or lower panel 42, 44, positioned in a longitudinal plane between the arms 76.1, 76.2, orifices passing through the arms 76.1, 76.2 and the web 52A that are aligned and a pivot pin 78 housed in the orifices passing through the arms 76.1, 76.2 and the web 52A and oriented in the transverse direction.

According to this embodiment, the intermediate ribs 52 are pre-pierced before being secured to the upper and lower panels 42, 44 and to the front and rear spars 46, 48. Thus, the step of securing the assembly supports 60, 60', 60" in the central wing box 40 does not require any piercing but only the placement of the pivot pins 78, and this makes it possible to reduce the time necessary for this securing step.

According to one arrangement, a clearance is provided between the arms 76.1, 76.2 of each clevis 76 and the web 52A of the intermediate rib 52. This clearance allows a degree of tolerance in the transverse direction for the positioning of the clevises 76 of each assembly support 60, 60', 60" relative the webs 52A of the intermediate ribs 52.

In order to obtain a degree of tolerance in the vertical and/or longitudinal directions, each of the first and second connections 62, 64 comprises a double eccentric interposed between the pivot pin 78 and the through-orifice of the web 52A of the intermediate rib 52. As a variant, for each rod of each assembly support 60, 60', 60", the through-orifices of the arms 76.1, 76.2 of the clevis of the first or second connection 62, 64 are pierced after measurement of the inter-axis distance between the through-orifice of the web of the first part 52.1 of the intermediate rib 52 connected to the upper panel 42 and the through-orifice of the web of the second part 52.2 of the intermediate rib 52 connected to the lower panel 44.

Of course, the invention is not limited to this embodiment for the first and second connections 62, 64.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assembling a central wing box having a main structure that comprises an upper panel and a lower panel offset in a vertical direction and front and rear spars positioned in transverse planes perpendicular to a longitudinal direction and offset in this longitudinal direction, and an equipment positioned at least partially inside the central wing box and connected to the main structure, the method comprising:
   assembling, at least partially, the main structure,
   fastening the equipment to a plurality of assembly supports positioned outside the main structure, such that the plurality of assembly supports are positioned in a same plane which is substantially parallel to the front or rear spar and are held at least temporarily immobile relative to one another so as to form a module,
   after fastening the equipment to said plurality of assembly supports to form said module, inserting said module inside the main structure, and
   securing said module to the main structure by virtue of at least one first connection directly or indirectly connecting said module to the upper panel and at least one second connection directly or indirectly connecting said module to the lower panel.

2. The method according to claim 1, wherein the module is introduced and fastened, as a single unit, in the central wing box.

3. The method according to claim 2, wherein the assembly supports of the plurality of assembly supports are temporarily connected to a template during the inserting and the securing the assembly supports of the plurality of assembly supports, the template being removed from the main structure after the step of securing the assembly supports of the plurality of assembly supports.

4. The method according to claim 1, wherein each assembly support comprises first and second connecting rods connected to the plate along an entire length between a lower edge and an upper edge of the plate and spaced apart from each other, the first and second connecting rods each having a first end directly or indirectly connected to the upper panel by the first connection and a second end directly or indirectly connected to the lower panel by the second connection.

5. The method according to claim 4, wherein the first and second connecting rods are positioned in substantially longitudinal planes which are transverse to the plane of the plurality of assembly supports.

6. The method according to claim 4, wherein the central wing box comprises intermediate ribs each connected to at least one element among the upper and lower panels, such that the first and second connecting rods are connected to the intermediate ribs.

7. A central wing box comprising:
   a main structure that comprises an upper panel and a lower panel offset in a vertical direction and front and rear spars positioned in transverse planes perpendicular to a longitudinal direction and offset in this longitudinal direction;
   an equipment positioned at least partially inside the central wing box and connected to the main structure; and,
   a plurality of supports to which the equipment is fastened, such that the plurality of assembly supports are positioned in a same plane which is substantially parallel to the front or rear spar and are held at least temporarily immobile relative to one another so as to form a module, at least one first connection directly or indirectly connecting the module and the upper panel of the main structure and at least one second connection directly or indirectly connecting the module and the lower panel of the main structure.

8. The central wing box according to claim 7, wherein each assembly support comprises at least one plate, to which the equipment is fastened.

9. The central wing box according to claim 8, wherein each assembly support comprises first and second connecting rods connected to the plate along an entire length between a lower edge and an upper edge of the plate and spaced apart from each other, the first and second connecting rods each having a first end directly or indirectly connected to the upper panel by the first connection and a second end directly or indirectly connected to the lower panel by the second connection.

10. The central wing box according to claim 9, wherein the first and second connecting rods are positioned in substantially longitudinal planes which are transverse to the plane of the plurality of assembly supports.

11. The central wing box according to claim 7, wherein at least one of the first and second connections comprises a pivot connection having a pivot axis oriented in a transverse direction perpendicular to the vertical and longitudinal directions.

12. The central wing box according to claim 11, wherein the first or second connection comprises:

a clevis as one with the at least one assembly support and having spaced-apart arms, a web as one with the upper panel or the lower panel, or with an element connected to the upper panel or the lower panel, positioned in a longitudinal plane between the arms, orifices passing through the arms and the web, said orifices being aligned, a pivot pin, connecting the clevis and the web, housed in the orifices passing through the arms and the web, said pivot pin being oriented in the transverse direction.

13. The central wing box according to claim 9, wherein the central wing box comprises intermediate ribs each connected to at least one element among the upper and lower panels, such that the first and second connecting rods are connected to the intermediate ribs.

14. An aircraft comprising:
the central wing box according to claim 7.

\* \* \* \* \*